United States Patent
Kwan et al.

(10) Patent No.: US 7,792,385 B2
(45) Date of Patent: Sep. 7, 2010

(54) SCRATCH PAD FOR STORING INTERMEDIATE LOOP FILTER DATA

(75) Inventors: Bill Kwan, Austin, TX (US); Erik Schlanger, Austin, TX (US); Raquel Rozas, Evanston, IL (US); Casey King, Austin, TX (US)

(73) Assignee: GlobalFoundries Inc., Grand Cayman (KY)

( * ) Notice: Subject to any disclaimer, the term of this patent is extended or adjusted under 35 U.S.C. 154(b) by 968 days.

(21) Appl. No.: 11/042,218

(22) Filed: Jan. 25, 2005

(65) Prior Publication Data

US 2006/0165164 A1 Jul. 27, 2006

(51) Int. Cl.
G06K 9/40 (2006.01)
G06K 9/36 (2006.01)
G06K 9/46 (2006.01)
H04N 7/12 (2006.01)
H04N 11/02 (2006.01)
H04B 14/06 (2006.01)

(52) U.S. Cl. .................... 382/268; 382/260; 382/236; 375/240.01; 375/240.03; 375/240.05; 375/240.24; 375/245

(58) Field of Classification Search .......... 382/268, 382/260, 236; 375/240.01, 240.03, 240.05, 375/240.24, 245
See application file for complete search history.

(56) References Cited

U.S. PATENT DOCUMENTS

| | | | |
|---|---|---|---|
| 4,631,750 A | 12/1986 | Gabriel et al. | |
| 5,097,518 A | 3/1992 | Scott et al. | |
| 5,546,479 A | 8/1996 | Kawanaka et al. | |
| 5,872,866 A | 2/1999 | Strongin et al. | 382/233 |
| 5,903,313 A | 5/1999 | Tucker et al. | 375/240.15 |
| 5,923,782 A | 7/1999 | Chhabra et al. | |
| 5,974,197 A * | 10/1999 | Lee et al. | 382/268 |
| 6,075,918 A | 6/2000 | Strongin et al. | 386/68 |
| 6,259,734 B1 | 7/2001 | Boon | |
| 6,314,209 B1 | 11/2001 | Kweon et al. | |
| 6,348,925 B1 | 2/2002 | Potu | |
| 6,360,024 B1 * | 3/2002 | Tan et al. | 382/260 |
| 6,441,754 B1 | 8/2002 | Wang et al. | |
| 6,614,930 B1 | 9/2003 | Agnihotri et al. | |
| 6,859,558 B2 * | 2/2005 | Hong | 382/236 |

(Continued)

FOREIGN PATENT DOCUMENTS

EP 1 351 513 10/2003

OTHER PUBLICATIONS

International Search Report and Written Opinion of the International Searching Authority, PCT/US2006/001599, mailed May 31, 2006.

(Continued)

Primary Examiner—Matthew C Bella
Assistant Examiner—Michael A Newman
(74) Attorney, Agent, or Firm—Hamilton & Terrile, LLP; Michael Rocco Cannatti

(57) ABSTRACT

A video processing apparatus and methodology are implemented as a combination of a processor and a video decoding hardware block to decode video data by providing the video decoding block with an in-loop filter and a scratch pad memory, so that the in-loop filter may efficiently perform piecewise processing of overlap smoothing and in-loop deblocking in a macroblock-based fashion which is a much more efficient algorithm than the frame-based method.

19 Claims, 7 Drawing Sheets

U.S. PATENT DOCUMENTS

| | | | |
|---|---|---|---|
| 6,859,561 | B2 | 2/2005 | Mitchell et al. |
| 7,006,112 | B2 | 2/2006 | Chia et al. |
| 7,162,093 | B2 * | 1/2007 | Regunathan et al. .......... 382/233 |
| 2002/0071599 | A1 | 6/2002 | Herget et al. |
| 2003/0118114 | A1 | 6/2003 | Penna |
| 2003/0138150 | A1 | 7/2003 | Srinivasan .................. 382/238 |
| 2003/0158987 | A1 | 8/2003 | MacInnis et al. |
| 2003/0206664 | A1 | 11/2003 | Gomila et al. .............. 382/268 |
| 2004/0062307 | A1 | 4/2004 | Hallapuro et al. |
| 2004/0213345 | A1 | 10/2004 | Holcomb et al. ....... 375/240.03 |
| 2004/0218671 | A1 | 11/2004 | Haraguchi et al. |
| 2005/0013494 | A1 * | 1/2005 | Srinivasan et al. .......... 382/233 |
| 2005/0031216 | A1 | 2/2005 | Kondo et al. |
| 2005/0047666 | A1 | 3/2005 | Mitchell et al. |
| 2005/0259688 | A1 * | 11/2005 | Gordon ...................... 370/477 |
| 2005/0259887 | A1 * | 11/2005 | Hellman ..................... 382/260 |
| 2005/0281339 | A1 | 12/2005 | Song ..................... 375/240.24 |
| 2006/0165181 | A1 * | 7/2006 | Kwan et al. ............ 375/240.24 |

OTHER PUBLICATIONS

Bin Sheng et al., "A platform-based architecture of loop filter for AVS," Signal Processing 2004, Proceedings, ICSP '04, 2004 7th International Conference on Beijing, China Aug. 31-Sep. 4, 2004, Piscataway NJ, IEEE, Aug. 31, 2004, pp. 571-574.

Bin Sheng et al., "An implemented architecture of deblocking filter for H.264/AVC," Image Processing, 2004, ICIP '04, 2004 International Conference on Singapore, Oct. 24-27, 2004, Piscataway, NJ, IEEE vol. 1, Oct. 24, 2004, 665-668.

Lee Y-L et al., "Loop filtering and post-filtering for low-bit-rates moving picture coding," Signal Processing, Image Communication, Elsevier Science Publishers, Amsterdam, NL, vol. 16, No. 9, Jun. 2001, pp. 871-890.

Srinivasan S. et al., "Windows Media Video 9: Overview and applications," Signal Processing, Image Communication, Elsevier Science Publishers, Amsterdam, NL, vol. 19, No. 9, Oct. 2004, pp. 851-875.

V. Venkatraman et al., "Architecture for De-Blocking Filter in H.264," Picture Coding Symposium (PCS) San Francisco, 2004, 5 pages.

X. Sun et al., "In-Loop Deblocking Filter for Block-Based Video Coding," International Conference on Signal Processing, vol. 1, pp. 33-36 (2002) http://research.microsoft.com/asia/dload_files/group/imedia/2002p/deblocking_icsp_02.pdf, 4 pages.

Translation of Official Communication for German Application No. 11 2006 000 270.8-55, dated Apr. 29, 2009.

International Search Report and Written Opinion of the International Searching Authority, PCT/US2006/001598, mailed May 31, 2006.

Official Communication for German Patent Application No. 11 2006 000 271.6, dated May 8, 2009.

Translation of Office Action for Chinese Patent Application No. 200680002732.8, issued May 15, 2009.

Official Communication for Chinese Patent Application No. 200680002803.4, dated Jan. 8, 2010.

\* cited by examiner

SCRATCH PAD FOR STORING INTERMEDIATE LOOP FILTER DATA

BACKGROUND OF THE INVENTION

1. Field of the Invention

The present invention relates to video processing technology. In one aspect, the present invention relates to decompression of digital video information.

2. Description of the Related Art

Because video information requires a large amount of storage space, video information is generally compressed. Accordingly, to display compressed video information which is stored, for example on a CD-ROM or DVD, the compressed video information must be decompressed to provide decompressed video information. The decompressed video information is then provided in a bit stream to a display. The decompressed bit stream of video information is typically stored as a bit map in memory locations corresponding to pixel locations on a display. The video information required to present a single screen of information on a display is called a frame. A goal of many video systems is to quickly and efficiently decode compressed video information so as to provide motion video by displaying a sequence of frames.

Standardization of recording media, devices and various aspects of data handling, such as video compression, is highly desirable for continued growth of this technology and its applications. A number of (de)compression standards have been developed or are under development for compressing and decompressing video information, such as the Moving Pictures Expert Group (MPEG) standards for video encoding and decoding (e.g., MPEG-1, MPEG-2, MPEG-3, MPEG-4, MPEG-7, MPEG-21) or the Windows Media Video compression standards (e.g., WMV9). Each of the MPEG and WMV standards are hereby incorporated by reference in its entirety as if fully set forth herein.

In general, video compression techniques include intraframe compression and interframe compression which operate to compress video information by reducing both spatial and temporal redundancy that is present in video frames. Intraframe compression techniques use only information contained within the frame to compress the frame, which is called an I-frame. Interframe compression techniques compress frames with reference to preceding and/or following frames, and are typically called predicted frames, P-frames, or B-frames. Intraframe and interframe compression techniques usually use a spatial or block-based encoding whereby a video frame is split into blocks for encoding (also referred to as a block transformation process). For example, an I-frame is split into 8×8 blocks. The blocks are coded using a discrete cosine transform (DCT) coding scheme which encodes coefficients as an amplitude of a specific cosine basis function, or some other transform (e.g., integer transform). The transformed coefficients are then quantized, which produces coefficients with non-zero amplitude levels and runs (or subsequences) of zero amplitude level coefficients. The quantized coefficients are then run-level encoded (or run length encoded) to condense the long runs of zero coefficients. The results are then entropy coded in a variable length coder (VLC) which uses a statistical coding technique that assigns codewords to values to be encoded, or using some other entropy encoding techniques, such as a Context-based Adaptive Binary Arithmetic Coding (CABAC), Context Adaptive Variable Length Coding (CAVLC) and the like. Values having a high frequency of occurrence are assigned short codewords, and those having infrequent occurrence are assigned long codewords. On the average, the more frequent shorter codewords dominate so that the code string is shorter than the original data. Thus, spatial or block-based encoding techniques compress the digital information associated with a single frame. To compress the digital information associated with a sequence of frames, video compression techniques use the P-frames and/or B-frames to exploit the fact that there is temporal correlation between successive frames. Interframe compression techniques will identify the difference between different frames and then spatially encode the difference information using DCT, quantization, run length and entropy encoding techniques, though different implementations can use different block configurations. For example, a P-frame is split into 16×16 macroblocks (e.g., with four 8×8 luminance blocks and two 8×8 chrominance blocks) and the macroblocks are compressed. Regardless of whether intraframe or interframe compression techniques are used, the use of spatial or block-based encoding techniques to encode the video data means that the compressed video data has been variable length encoded and otherwise compressed using the block-based compression techniques described above.

At the receiver or playback device, the compression steps are reversed to decode the video data that has been processed with block transformations. FIG. 1 depicts a conventional system 30 for decompressing video information which includes an input stream decoding portion 35, motion decoder 38, adder 39, frame buffer 40, and display 41. Input stream decoder 35 receives a stream of compressed video information at the input buffer 31, performs variable length decoding at the VLC decoder 32, reverses the zig-zag and quantization at the inverse quantizer 33, reverses the DCT transformation at IDCT 34 and provides blocks of staticly decompressed video information to adder 39. In the motion decoding portion 38, the motion compensation unit 37 receives motion information from the VLC decoder 32 and a copy of the previous picture data (which is stored in the previous picture store buffer 36), and provides motion-compensated pixels to adder 39. Adder 39 receives the staticly decompressed video information and the motion-compensated pixels and provides decompressed pixels to frame buffer 40, which then provides the information to display 41.

With conventional video encoder and decoder designs, blocking artifacts (noticeable discontinuities between blocks) can be introduced into a frame from the block-based transform, motion compensation, quantization and/or other lossy processing steps. Prior attempts to reduce blocking artifacts have used overlap smoothing or deblocking filtering (either in-loop or post processing) to process frames by smoothing the boundaries between blocks. For example, with the WMV9 standard, it is specified that overlap smoothing and in-loop deblocking are processed on the whole picture to reduce blocking artifacts. With WMV9 decoding enabled, overlap smoothing is done only on the 8×8 block boundaries, starting with smoothing in the vertical direction for the whole frame, and then overlap smoothing is performed in the horizontal direction for the whole frame. Next, in-loop deblocking, when enabled, is done in this order: (i) all the 8×8 block horizontal boundary lines in the frame are filtered starting from the top line; (ii) all 8×4 sub-block horizontal boundary lines in the frame are filtered starting from the top line; (iii) all 8×8 block vertical boundary lines are filtered starting with the leftmost line; and (iv) all 4×8 sub-block vertical boundary lines are filtered starting with the leftmost line. Prior approaches use two passes on the entire frame, where the first pass is to perform overlap smoothing, and the second step is for in-loop deblocking. While there may be other requirements (e.g., involving a parameter PQUANT and block types) that also apply when determining whether or not to do the processing of the individual step, the goal of these processes is to smooth over the edges of 16×16 macroblock, 8×8 blocks or 4×4 sub-blocks, thereby removing the artifacts of blockiness introduced by the 2D transform and quantization.

With processor-based approaches for handling video decompression, the addition of a smoothing or deblocking function is a computationally intensive filtering process. This order of processing can be done in software when there is a large memory buffer to hold a frame (e.g. VGA size of 640× 480 pixels, equivalent to 307 kbytes). On the other hand, hardware-based approaches for decoding have not performed smoothing and deblocking at the same time, and have performed deblocking on the frame as a whole, which requires a large local memory, imposes significant bus bandwidth requirements and sacrifices memory access time. Consequently, a significant need exists for reducing the processing requirements associated with decompression methods and for improving the decompression operations, including specifically the overlap smoothing and/or deblocking filter operations. Further limitations and disadvantages of conventional systems will become apparent to one of skill in the art after reviewing the remainder of the present application with reference to the drawings and detailed description which follow.

SUMMARY OF THE INVENTION

By using a combination of software and hardware to perform video decompression, a flexible decompression system is provided that can be adapted to quickly and efficiently process a variety of different video compression schemes. The flexible decompression system includes a processor for performing front end decompression steps, and a video accelerator for performing back end decompression steps. To reduce the memory bandwidth requirements in the video accelerator for performing overlap smoothing and in-loop deblocking filter operations on video frame data, the in-loop filter is coupled to a scratch pad memory or storage device that facilitates the piecewise processing of overlap smoothing and in-loop deblocking in a macroblock-based fashion. The use of scratch pad to perform piecewise processing of the filtering operations in a macroblock-based fashion is much more efficient than the frame-based method. Since the size of the scratch pad memory is related to the width of the frame, the amount of on-chip memory is reduced. For example, the size of the scratch pad memory may be large enough to hold no more than a row of partially filtered blocks from a frame of video data.

In accordance with one or more embodiments of the present invention, a video processing system, apparatus and methodology are provided whereby a processor and video decode circuit decode video data that has been processed with block transformations into a plurality of macroblocks. In connection with the decode operations, an in-loop filter and scratch pad memory provided on one or more integrated circuits are used to perform piecewise processing by smoothing and deblocking selected pixel data in a first macroblock to generate one or more finished blocks and one or more partially filtered blocks, where at least one of the partially filtered blocks contains control data and pixel data that is stored in a scratch pad memory. As a result, any block that is adjacent to a previously processed macroblock may be completely filtering for overlap smoothing and deblocking and then output as a finished block during a first filter operation, while a block that is adjacent to a subsequently processed macroblock may be partially filtered for overlap smoothing and deblocking and then stored as a partially filtered block in the scratch pad memory. The scratch pad memory is used by the in-loop filter to provide a partially filtered block that is used for smoothing and deblocking pixel data in the first macroblock, where the fetched partially filtered block was previously generated during processing of a previous macroblock. By sequentially processing each row of macroblocks in a video frame for overlap smoothing and deblocking one macroblock at a time, the in-loop filter and scratch pad memory may be used to sequentially perform smoothing and deblocking on a plurality of macroblocks in pipelined fashion.

The objects, advantages and other novel features of the present invention will be apparent to those skilled in the art from the following detailed description when read in conjunction with the appended claims and accompanying drawings.

DETAILED DESCRIPTION

While illustrative embodiments of the present invention are described below, it will be appreciated that the present invention may be practiced without the specified details, and that numerous implementation-specific decisions may be made to the invention described herein to achieve the developer's specific goals, such as compliance with system-related and business-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid obscuring the present invention. Such descriptions and representations are used by those skilled in the art to describe and convey the substance of their work to others skilled in the art. The present invention will now be described with reference to the drawings described below.

Figure 1:
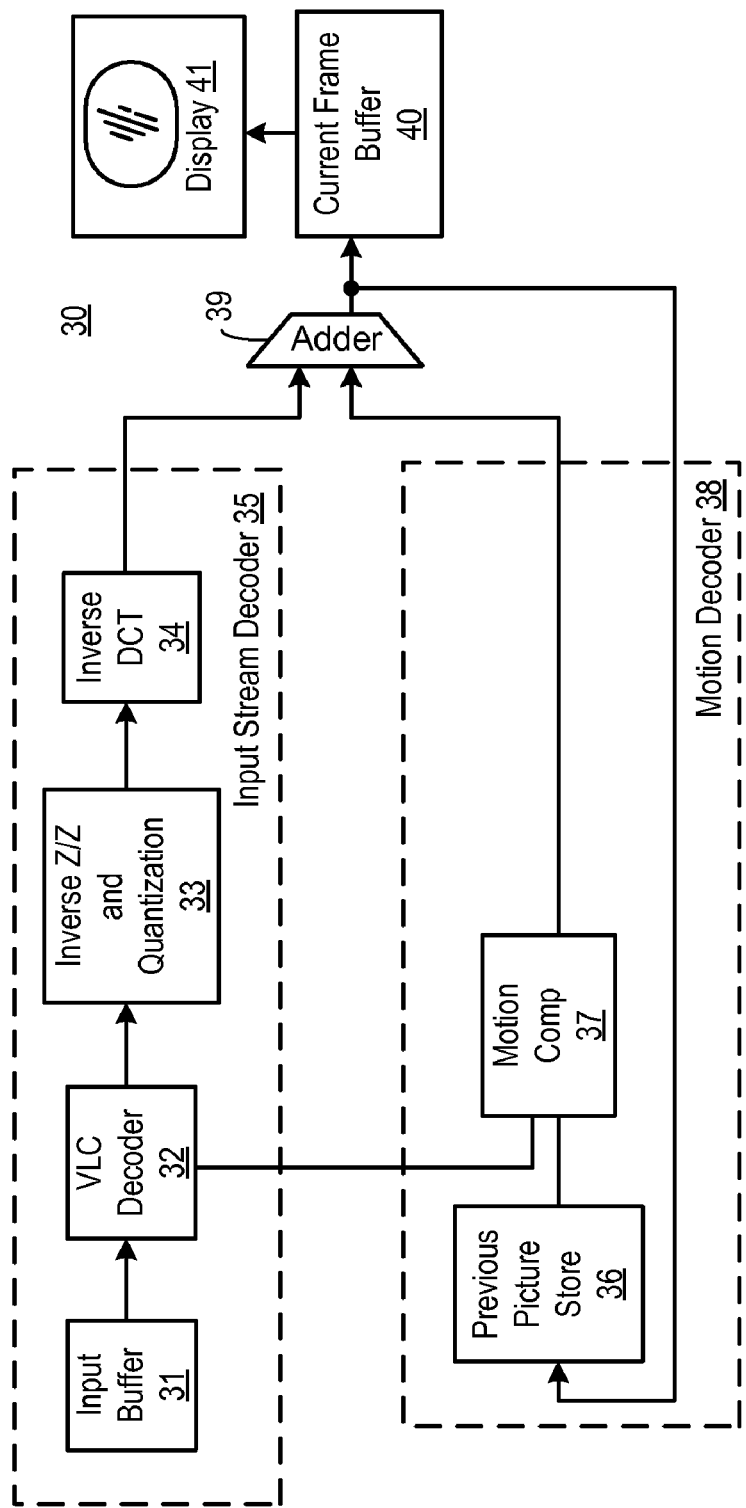
FIG. 1 shows a block diagram representation of a system for decompressing video information.
Figure 2:
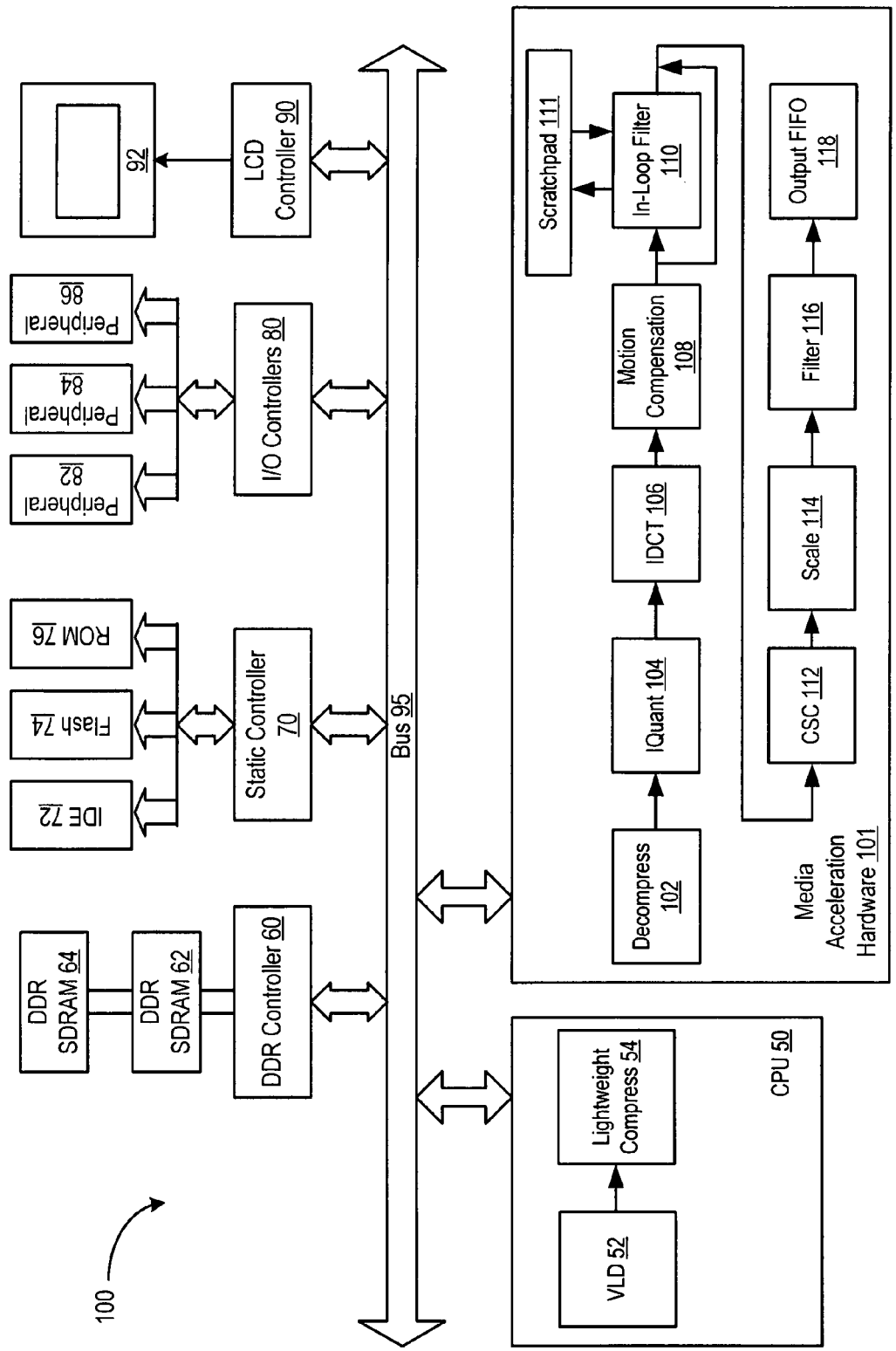
FIG. 2 shows a block diagram representation of an exemplary video decompression system constructed in accordance with the present invention.

Referring to FIG. 2, a block diagram representation of an exemplary video decompression system 100 in accordance with the present invention is provided. As depicted, the video decompression system 100 may implemented in any video playback device, such as desktop or laptop computer, wireless or mobile device, personal digital assistants, mobile or cellular phones, and any other video playback device that includes video imaging features. As depicted in FIG. 2, the video decompression system 100 is implemented as a host or applications processing unit that includes a bus 95 coupled to one or more processors or processing units 50 and a video or media acceleration hardware unit 101. In addition, the video decompression system 100 includes a main memory system that includes a large DDR SDRAM 62, 64 that is accessed through a DDR controller 60. In addition or in the alternative, one or more memories (e.g., IDE 72, flash memory unit 74, ROM 76, etc.) are accessed through the static memory controller 70. Either or both of the DDR SDRAM or other memories may be integrated with or external to the video decompression system 100. Of course, other peripheral and display devices (82, 84, 86, 92) may be accessed through the respective controllers 80, 90. For clarity and ease of understanding, not all of the elements making up the video decompression system 100 are described in detail. Such details are well known to those of ordinary skill in the art, and may vary based on the particular computer vendor and microprocessor type. Moreover, the video decompression system 100 may include other buses, devices, and/or subsystems, depending on the implementation desired. For example, the video decompression system 100 may include caches, modems, parallel or serial interfaces, SCSI interfaces, network interface cards, and the like. In the illustrated embodiment, the CPU 50 executes software stored in the flash memory 74 and/or SDRAM 62, 64.

In the video decompression system 100 depicted in FIG. 2, the CPU 50 performs the initial variable length decoding function, as indicated at the VLD block 52, while the media acceleration hardware unit 101 performs the inverse quantization 104, inverse transform 106, motion compensation 108, in-loop filtering 110, color space conversion 112, scaling 114 and filtering 116 on the decode data. The resulting decoded data may be temporarily stored in an output buffer 118 and/or frame buffer (not shown) before being displayed on the display 92. By dividing the decode processing functions between the processor 50 and media acceleration hardware 101, the front end decoding steps (e.g., variable length decoding) can be implemented in software to accommodate a variety of different compression schemes (e.g., MPEG-1, MPEG-2, MPEG-3, MPEG-4, MPEG-7, MPEG-21, WMV9, etc.). The decode data generated by the front end is provided to the media acceleration hardware 101 which further decodes the decode data to provide pixel values to output buffer 118 or frame buffer on a macroblock by macroblock basis until a frame is completed.

In operation, the video decompression system 100 receives a compressed video signal from a video signal source such as a CD ROM, DVD or other storage device. The compressed video signal is provided as a stream of compressed video information to the processor 50 which executes instructions to decode the variable length coded portion of the compressed signal to provide a variable length decoded data (VLD data) signal. Once the software assist is employed to perform variable length decoding, the VLD data (which includes headers, matrix weights, motion vectors, transformed residue coefficients and even differential motion vectors) is conveyed to the media acceleration hardware unit 101, either directly or using the data compression techniques described more fully in U.S. patent application Ser. No. 11/042,365 (entitled "Lightweight Compression Of Input Data"). At the media acceleration hardware unit 101, once the VLD data is received, the data is provided to the inverse zig-zag and quantizer circuit 104 which decodes the VLD data signal to provide a zig-zag decoded signal. The inverse zig-zag and quantization compensates for the fact that, while a compressed video signal is compressed in a zig-zag run-length code fashion, the zig-zag decoded signal is provided to inverse DCT circuit 106 as sequential blocks of information. Accordingly, this zig-zag decoded signal provides blocks which are in the order required for raster scanning across display 92. This zig-zag decoded signal is then provided to inverse transform circuit 106 (e.g., IDCT or inverse integer transform) which performs an inverse discrete cosine transform on the zig-zag decoded video signal on a block by block basis to provide staticly decompressed pixel values or decompressed error terms. The staticly decompressed pixel values are processed on a block-by-block basis through the motion compensation unit 108 which provides intraframe, predicted, and bidirectional motion compensation, including support for one, two and four motion vectors (16×16, 16×8 and 8×8 blocks). The in-loop filter 110 performs overlap smoothing and/or deblocking to reduce or eliminate blocking artifacts in accordance with the WMV9 compression standard by using the scratch pad memory 111 to store partially finished macroblock filter data, as described more fully below. The color space converter 112 converts one or more input data formats (e.g., YCbCr 4:2:0) into one or more output formats (e.g., RGB), and the result is filtered and/or scaled at filter 116.

As disclosed herein, the smoothing and deblocking in-loop filter 110 removes boundary discontinuities between neighboring blocks by partially filtering or processing each row of macroblocks during a first pass, and then completing the processing of the partially processed blocks during the processing of the next row of macroblocks. With this technique, a small scratch pad memory 111 may be efficiently used to store the partially processed blocks in a scratch pad memory, in contrast with using a large memory to store the entire frame image for filtering, as occurs with conventional deblocking processes. As the processing of each block for overlap smoothing and deblocking is completed on a row-by-row basis, the completed blocks may be output from the filter 110 to a FIFO buffer (not shown) before being transferred to the CSC 112.

Figure 3:
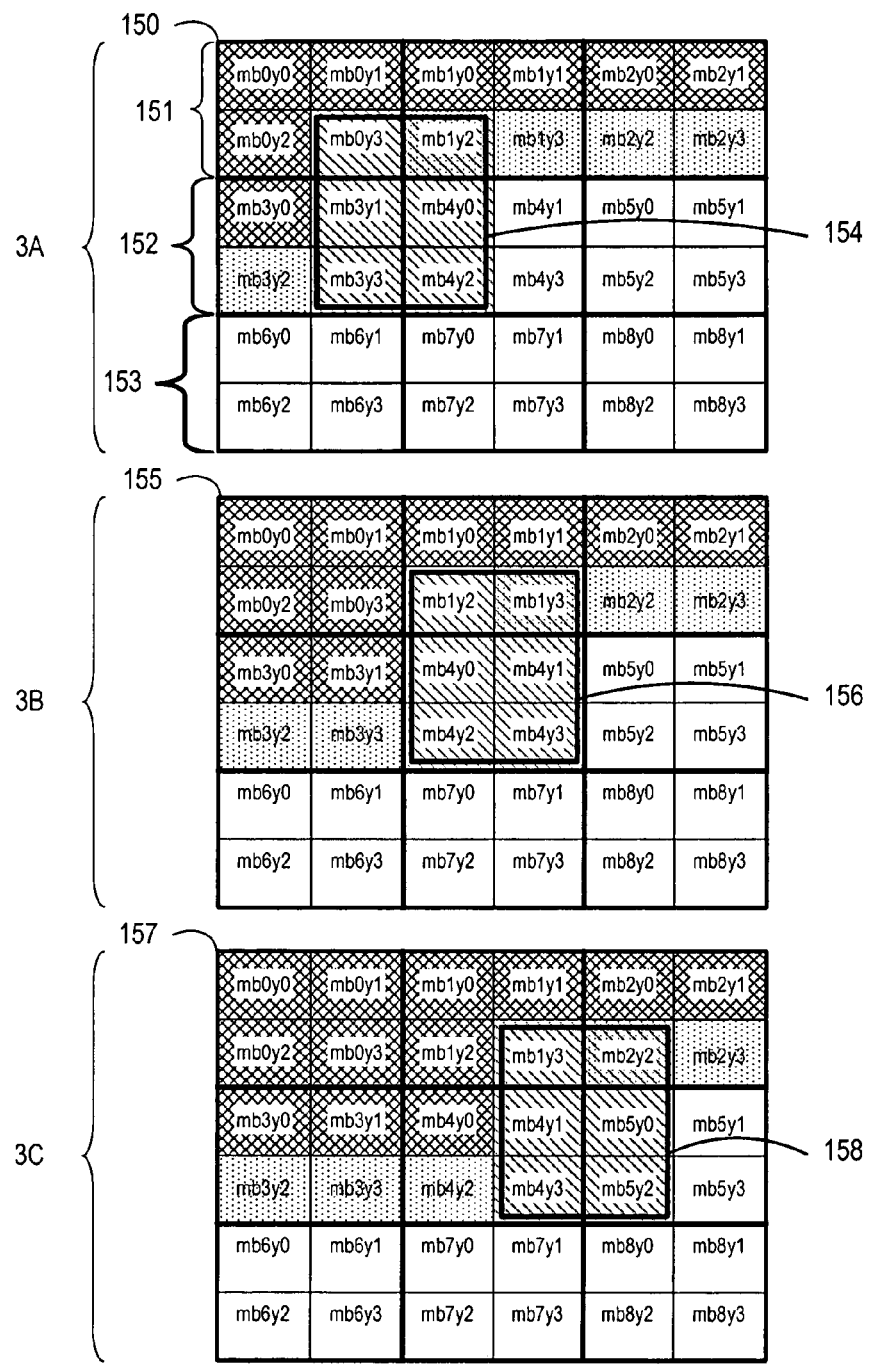
FIG. 3 depicts a simplified illustration of an in-loop filtering process which uses a scratch pad memory to efficiently handle overlap smoothing and in-loop deblocking in hardware in accordance with a selected embodiment of the present invention.
Figure 3:
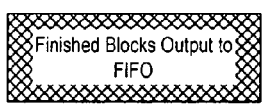
Figure 3:
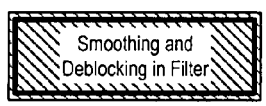
Figure 3:
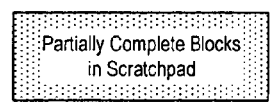

FIG. 3 depicts a simplified illustration of a macroblock-based in-loop filtering process which uses a scratch pad memory to efficiently handle overlap smoothing and deblocking in accordance with a selected embodiment of the present invention. In the filtering process, each pass of the in-loop filter through a row of macroblocks generates completely finished blocks (which have been fully filtered to smooth and deblock the blocks) and partially finished blocks (which are stored in the scratch pad memory for subsequent use in smoothing and deblocking the next row of macroblocks). As depicted, every single macroblock (e.g., example macroblock 4 or "mb4" which includes four luma blocks $mb4y0$, $mb4y1$, $mb4y2$ and $mb4y3$) in the in-loop filtering process goes through the following order of processing:

(i) completely finish the smoothing and deblocking of the 8×8 blocks (e.g., $mb4y0$, $mb4y1$) adjacent to the previous macroblock (e.g., macroblock 1) and partially finish the smoothing and deblocking of the 8×8 blocks (e.g., $mb4y2$, $mb4y3$) adjacent to the next macroblock (e.g., macroblock 7);

(ii) output the finished 8×8 blocks (e.g., $mb4y0$, $mb4y1$) and store the partially finished 8×8 blocks (e.g., $mb4y2$, $mb4y3$) in the scratch-pad memory;

(iii) fetch the partially completed 8×8 blocks (e.g., $mb4y2$, $mb4y3$) from the scratch-pad memory when the next macroblock (e.g., macroblock 7) is in process and finish the processing of the fetched 8×8 blocks (e.g., $mb4y2$, $mb4y3$); and (iv) output the finished 8×8 blocks (e.g., $mb4y2$, $mb4y3$) along with the finished 8×8 blocks of the next macroblock (e.g., $mb7y0$, $mb7y1$).

While the implementation details may vary by application, FIG. 3 depicts an illustrative embodiment wherein the image frame 150 being processed by the in-loop filter 110 is constructed of macroblocks (e.g., macroblocks mb0, mb1, mb2, mb3, mb4, mb5, mb6, mb7, mb8, etc.) and is arranged in multiple rows (e.g., a first row 151 constructed of mb0, mb1 and mb2). As depicted at FIG. 3A, the in-loop filter 110 has already made a first pass across the first row of macroblocks 151. As a result of the first pass across the first row 151, the upper blocks (mb0$y$0, mb0$y$1, mb1$y$0, mb1$y$1, mb2$y$0, mb2$y$1) are completely processed for overlap smoothing and deblocking (as indicated by the cross-hatching), while the lower blocks (mb0$y$2, mb0$y$3, mb1$y$2, mb1$y$3, mb2$y$2, mb2$y$3) are only partially processed for overlap smoothing and deblocking. For purposes of completing the partially processed blocks from the first row 151 during the next pass of macroblock processing, the partially processed blocks from the first row 151 are stored in a scratch pad memory 111 (as indicated by the dot pattern).

As additionally depicted in FIG. 3A, the in-loop filter 110 has started processing the second row of macroblocks 152 with a process that will complete the partially processed blocks from the first row 151. As a result, the mb0$y$2 and mb3$y$0 blocks have been completely processed for smoothing and deblocking, and the mb3$y$2 block is only partially processed (and stored in the scratch pad). As for the blocks to be processed by the filter 110 at FIG. 3A (as indicated at the diagonal hatching with the filtered blocks 154), the mb0$y$3, mb3$y$1 and mb3$y$3 blocks have been partially processed for smoothing and deblocking (and retained in the filter 110), the mb1$y$2 block is a partially finished block that has been fetched from the scratch pad, and the remaining blocks (mb4$y$0 and mb4$y$2) are obtained from the current macroblock (e.g., macroblock 4). As the in-loop filter 110 processes the filtered blocks 154, smoothing and deblocking is finished on one or more of the partially processed blocks (e.g., mb0$y$3, mb3$y$1), while the remaining blocks (mb1$y$2, mb4$y$0, mb4$y$2 and mb3$y$3) are only partially finished.

After processing the filtered blocks 154, the in-loop filter 110 shifts in new data. This is illustrated with the frame 155 shown in FIG. 3B, which shows that the filter 110 acquires filtered blocks 156 by outputting any finished blocks (e.g., mb0$y$3, mb3$y$1), by storing one or more of the partially finished blocks (e.g., mb3$y$3) in the scratch pad memory, by shifting the remaining partially finished blocks (e.g., mb1$y$2, mb4$y$0, mb4$y$2) in the filter by one block position, by fetching a partially finished block (e.g., mb1$y$3) from the previous row of macroblocks and by loading new blocks (e.g., mb4$y$1, mb4$y$3) from the current macroblock. As the in-loop filter 110 processes the filtered blocks 156, smoothing and deblocking is finished on one or more of the partially processed blocks (e.g., mb1$y$2, mb4$y$0), while the remaining blocks (mb1$y$3, mb4$y$1, mb4$y$3 and mb4$y$2) are only partially finished.

After processing the filtered blocks 156, the in-loop filter 110 again shifts in new data as illustrated with the frame 157 shown in FIG. 3C. In particular, the filter 110 acquires filtered blocks 158 by outputting any finished blocks (e.g., mb1$y$2, mb4$y$0), by storing one or more of the partially finished blocks (e.g., mb4$y$2) in the scratch pad memory, by shifting the remaining partially finished blocks (e.g., mb1$y$3, mb4$y$1, mb4$y$3) in the filter by one block position, by fetching a partially finished block (e.g., mb2$y$2) from the previous row of macroblocks and by loading new blocks (e.g., mb5$y$0, mb5$y$2) from the current macroblock. As the in-loop filter 110 processes the filtered blocks 158, smoothing and deblocking is finished on one or more of the partially processed blocks (e.g., mb1$y$3, mb4$y$1), while the remaining blocks (mb2$y$2, mb5$y$0, mb5$y$2 and mb4$y$3) are only partially finished. At this point, smoothing and deblocking on the upper blocks (mb4$y$0, mb4$y$1) in macroblock 4 have been finished, but the lower blocks (mb4$y$2, mb4$y$3) have been only partially finished. By storing the partially stored lower blocks in the scratch pad memory, the filtering operations can be completed when the filter 110 processes the next row of macroblocks.

Figure 4:
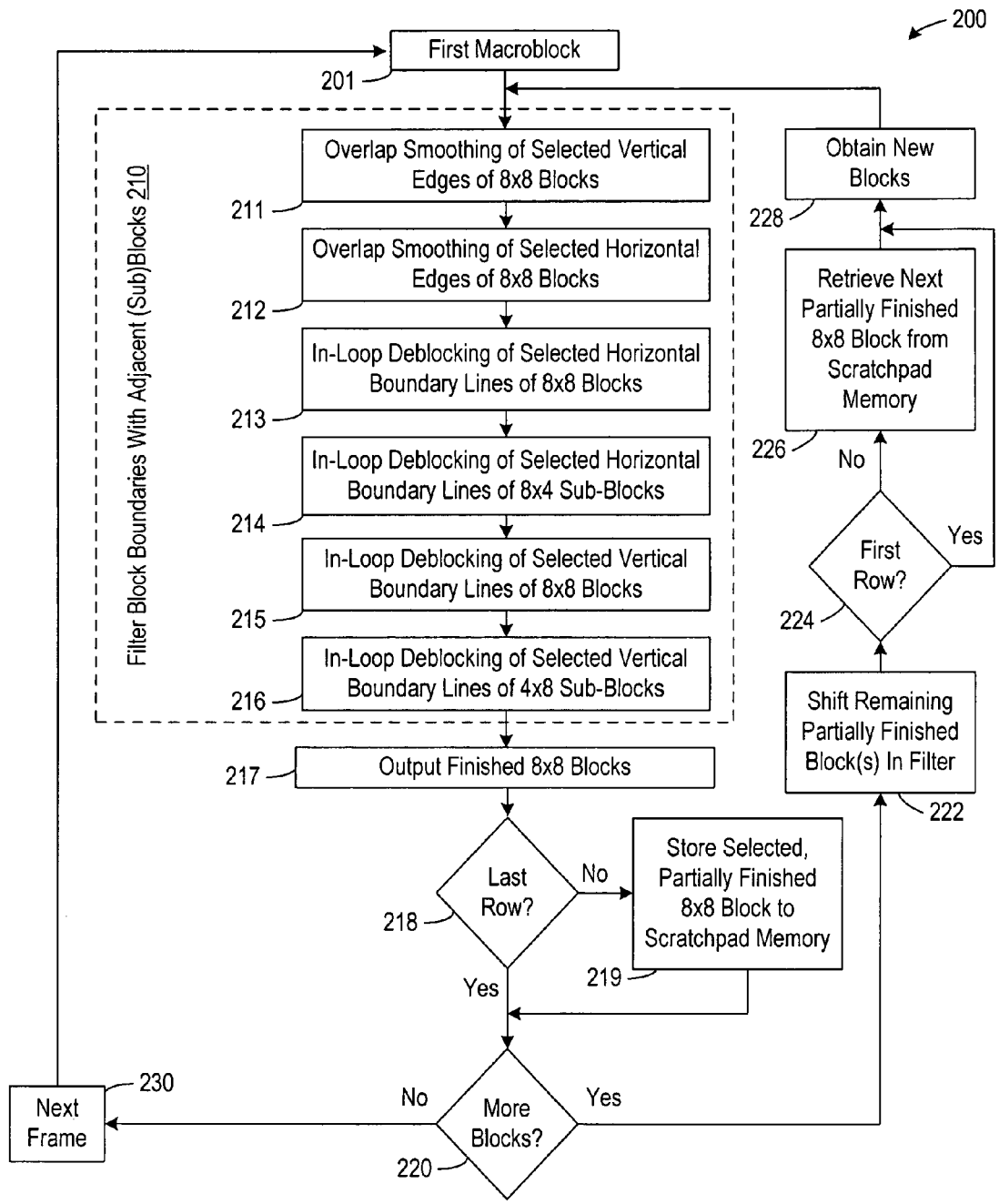
FIG. 4 depicts an example technique for reducing blockiness in a decoded frame using a smoothing and deblocking filter in a video encoder or decoder.

Additional details of an alternative embodiment of the present invention are illustrated in FIG. 4 which shows a technique (200) for reducing blockiness in a decoded frame using a smoothing and deblocking filter in a video encoder or decoder. As will be appreciated, the depicted technique may be used to process luma or chroma blocks, though there may be special corner cases at the periphery of each frame where those skilled in the art will adjust and apply the present invention as required. However, for the sake of simplicity, the present disclosure focuses primarily on the in-loop filtering steps that are performed on the interior macroblocks of each frame.

With reference to FIG. 4, once the video encoder/decoder generates at least the first macroblock for the frame (201), the in-loop filter processes the top row of macroblocks one macroblock at a time to filter the boundaries of each block with its neighboring blocks. As will be appreciated, because there is no smoothing or deblocking performed on the periphery of the frame, there are no partially finished blocks outside the frame to use in the filtering process. However, as the first row of macroblocks is filtered, the scratch pad memory is filled with partially finished blocks. Starting with the first macroblock (201), the encoder/decoder loads the required blocks and retrieves from the scratch pad any partially finished adjacent block from above (except for the first row of macroblocks). Where a macroblock consists of four blocks of luma (y0, y1, y2, y3) and two blocks of chroma (Cb, Cr), the blocks enter the encoder/decoder hardware in the following order: y0, y1, y2, y3, Cb, Cr.

Next, the video encoder/decoder filters predetermined boundaries of the blocks loaded in the filter with neighboring blocks or sub-blocks (210). In a selected embodiment, a piecewise processing technique may be used to partially process each block in the filter. For example, after decoding an 8×8 block in either luminance or chrominance planes, all or part of the left and/or right (vertical) edges are subjected to a smoothing filter process (211). In addition or in the alternative, all or part of the top and/or bottom (horizontal) edges of the block are subjected to a smoothing filter process (212). In addition to overlap smoothing, a deblocking filter process may be applied to all or part selected horizontal boundary lines of the 8×8 blocks (213) and/or to all or part selected horizontal boundary lines of the 8×4 sub-blocks (214). In addition or in the alternative, the deblocking filter process may be applied to all or part selected vertical boundary lines of the 8×8 blocks (215) and/or to all or part selected vertical boundary lines of the 4×8 sub-blocks (216).

Once the blocks in the filter have been piecewise processed, the results are stored or shifted in the filter for additional processing. In particular, to allow the filter to process new data, any finished blocks in the filter are output from the filter (217). In addition, any partially finished blocks that will not be processed with the new blocks are stored in a scratch pad memory (219) for subsequent use and additional processing with the next row of macroblocks, unless the last row of macroblocks is being processed (negative outcome from decision 218), in which case the scratch pad storage step (219) may be skipped.

Having created space in the filter by storing selected blocks (217, 219), the filter can now process new data. In particular, if there are additional blocks in the frame (affirmative outcome to decision 220), the remaining partially filtered blocks in the filter are shifted to the left (222). For rows below the top row (negative outcome to decision 224), the available space in the filter is filled by retrieving the next partially finished block from the scratch pad memory (226), and any remaining space in the filter is filled with new blocks (228). Once the filter is loaded with new data, the block filtering process 210 is repeated on the new set of filter blocks. By repeating this sequence of operations, each macroblock in the frame is sequentially filtered to retrieve partially finished blocks from the scratch pad that were generated during processing of the previous row of macroblocks, and to store partially filtered blocks in the scratch pad for subsequent use during processing of the next row of macroblocks. On the other hand, if there are no remaining blocks to be filtered (negative outcome to decision 222), the smoothing and deblocking processing for the current frame is finished. At this point, the next frame is retrieved (230), and the filter process is repeated, beginning with the first macroblock in the new frame.

Figure 5A:
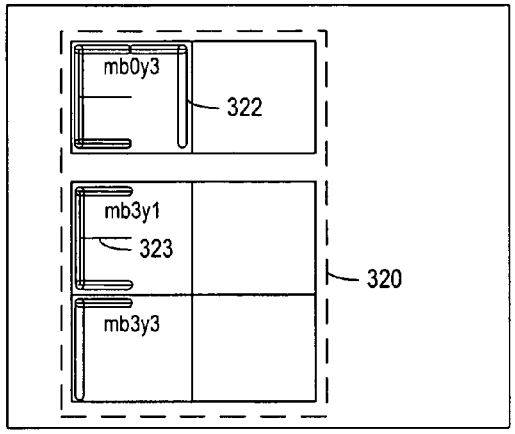
FIGS. 5A-K illustrate how piecewise processing may be used to implement smoothing and deblocking procedures for luma blocks.

Turning now to FIGS. 5A-K, an illustrative embodiment of the present invention is depicted to show how the WMV9 smoothing and deblocking procedures may be implemented on a luma blocks in macroblock 4 or ("mb4") with a piecewise processing technique. The starting point for the filtering process is depicted in FIG. 5A, where the filter 320 is already loaded with blocks (e.g., mb0$y$3, mb3$y$1 and mb3$y$3) that have already been partially processed for overlap smoothing (see, e.g., the oval indication 322) and deblocking (see, e.g., the line indication 323).

Figure 5B:
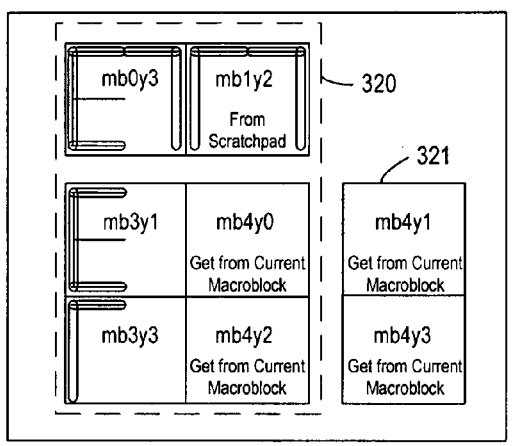

The filter 320 is then filled with additional blocks, as depicted in FIG. 5B. In particular, a partially finished block (e.g., mb1$y$2) is retrieved from the scratch pad memory and loaded in the filter. In addition, selected blocks (e.g., mb4$y$0, mb4$y$2) from the current macroblock (e.g., mb4) are loaded into the encoder/decoder, though the macroblock loading sequence (e.g., mb4$y$0, mb4$y$1, mb4$y$2 and mb4$y$3) requires that at least one of the blocks be loaded but not shifted into the filter 320 at this point, as indicated at 321.

Figure 5C:
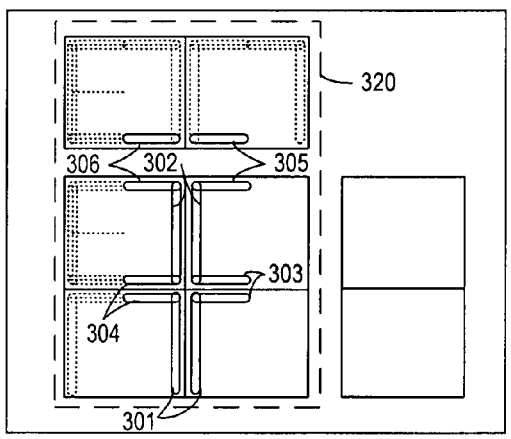

Once the filter blocks are loaded, the filter 320 performs piecewise overlap smoothing, as depicted in FIG. 5C. In particular, vertical overlap smoothing (V) is performed on selected interior vertical edges 301, 302. Next, horizontal overlap smoothing (H) is performed on selected interior horizontal edges (e.g., 303, 304, 305, 306).

Figure 5D:
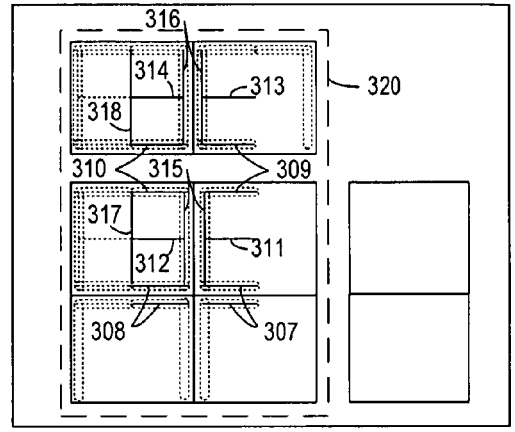

After the filter blocks are partially smoothed, the filter 320 performs piecewise deblocking, as depicted in FIG. 5D. First, horizontal in-loop deblocking (HD) is performed on selected 8×8 block boundaries (e.g., 307, 308, 309, 310), followed by horizontal in-loop deblocking at selected sub-block boundaries (HDH) (e.g., 311, 312, 313, 314). Next, the filter performs vertical in-loop deblocking (VD) on selected 8×8 block boundaries (e.g., 315, 316), followed by vertical in-loop deblocking at selected sub-block boundaries (VDH) (e.g., 317, 318).

Within each of the above-described smoothing and deblocking steps, the order in which the boundary pieces are filtered does not matter since there is no dependency between the boundary pieces. In addition to the specific sequencing of piecewise processing depicted in FIGS. 5C and 5D, other sequences and/or filtering steps may also be implemented in accordance with the present invention. For example, a different sequence of boundary edge pieces may be filtered. In addition, there may be more than one type of smoothing or deblocking modes applied, and the filtering operation may effect up to three or more pixels on either side of the boundary, depending on the filtering scheme. For example, the MPEG-4 standard uses two deblocking modes to apply a short filter to one pixel on either side of the block edge in one mode, and to apply a longer filter to two pixels on either side in the second mode. In other implementations, the filter definitions, number of different filters, and/or adaptive filtering conditions may be adapted to meet specific requirements.

Figure 5E:
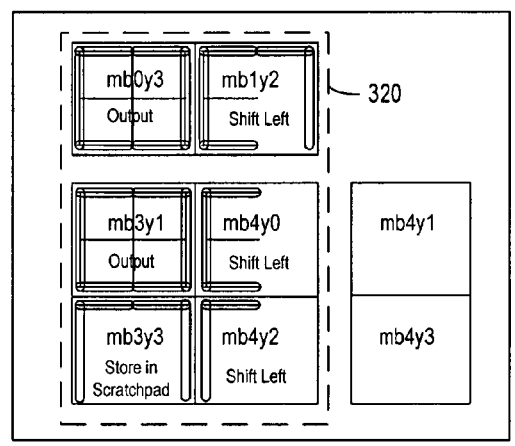
Figure 5F:
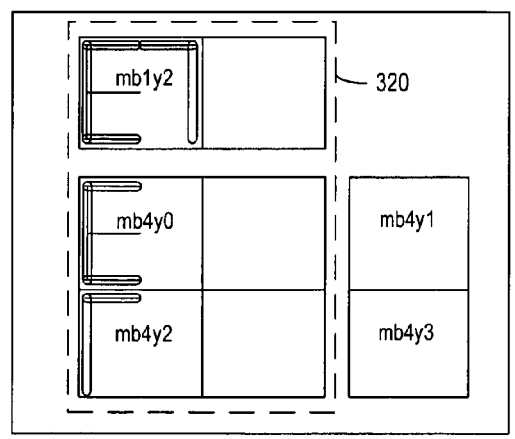

Once the smoothing and deblocking filter operations conclude, the processed filter blocks are stored and shifted, as indicated at FIG. 5E. In particular, any finished blocks (e.g., mb0$y$3, mb3$y$1) may then be output since they are complete. In addition, one or more partially finished blocks (e.g., mb3$y$3) may be moved to the scratch pad for subsequent use when processing the below adjacent macroblock (see e.g., macroblock 6 in relation to mb3$y$3 in FIG. 3). Any remaining partially finished blocks in the filter (e.g., mb1$y$2, mb4$y$0, mb4$y$2) may then be shifted in the filter to make room for new data. The result of the output, store and shift steps is depicted in FIG. 5F.

Figure 5G:
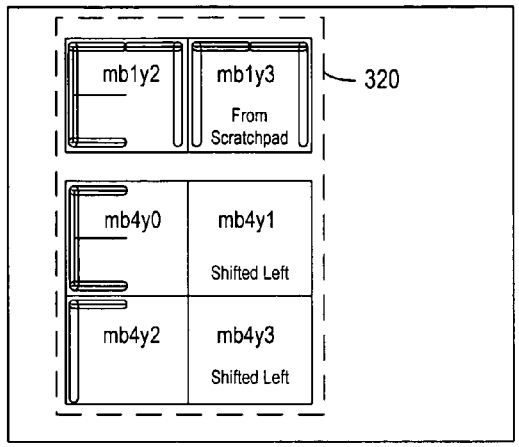

The filter 320 may now be filled with new data blocks, as depicted in FIG. 5G. In particular, a partially finished block (e.g., mb1$y$3) is retrieved from the scratch pad memory and loaded in the filter. In addition, the remaining blocks (e.g., mb4$y$1, mb4$y$3) from the current macroblock (e.g., mb4) are loaded into filter 320.

Figure 5J:
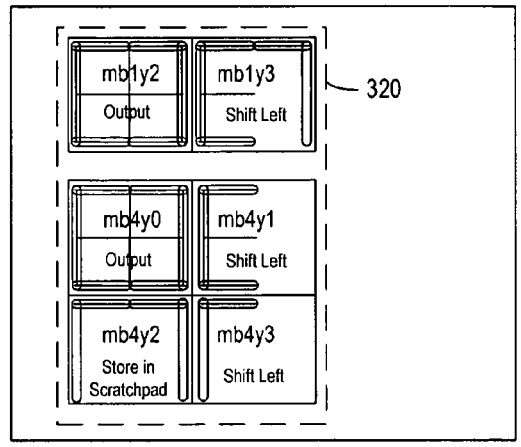
Figure 5H:
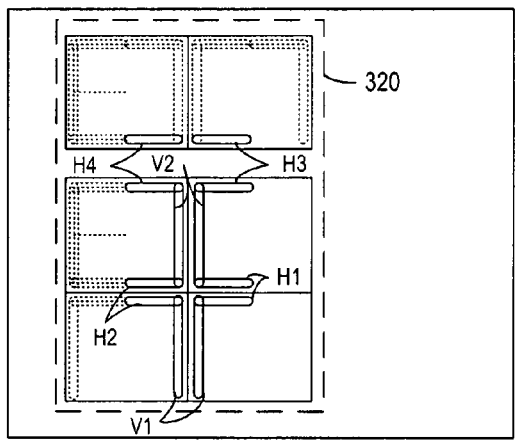

Once the filter blocks are loaded, the filter 320 performs piecewise overlap smoothing, as depicted in FIG. 5H. In particular, vertical overlap smoothing (V1, V2) is performed on selected interior vertical edges. Next, horizontal overlap smoothing (H1, H2, H3, H4) is performed on selected interior horizontal edges.

Figure 5K:
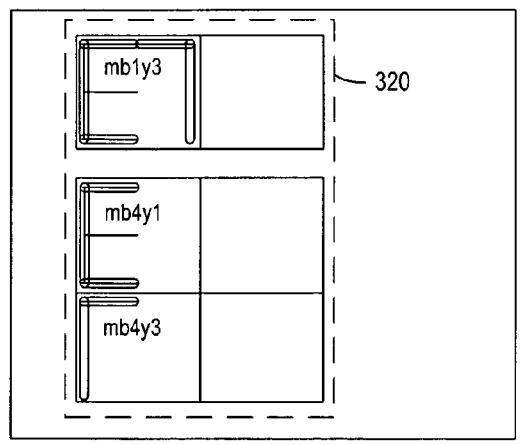
Figure 5I:
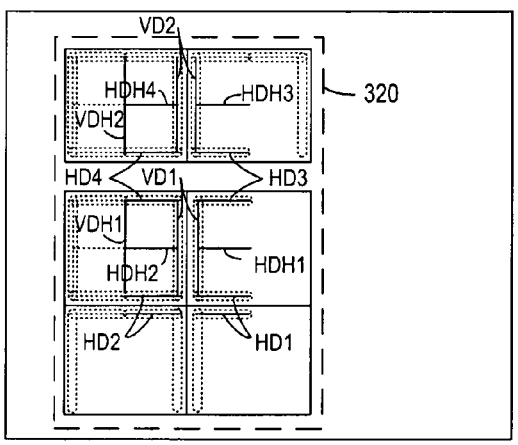

After the filter blocks are partially smoothed, the filter 320 performs piecewise deblocking, as depicted in FIG. 5I. First, horizontal in-loop deblocking (HD1, HD2, HD3, HD4) is performed on selected 8×8 block boundaries, followed by horizontal in-loop deblocking at selected sub-block boundaries (HDH1, HDH2, HDH3, HDH4). Next, the filter performs vertical in-loop deblocking (VD1, VD2) on selected 8×8 block boundaries, followed by vertical in-loop deblocking at selected sub-block boundaries (VDH1, VDH2).

Once the smoothing and deblocking filter operations conclude, the processed filter blocks are stored and shifted, as indicated at FIG. 5J. In particular, any finished blocks (e.g., mb1$y$2, mb4$y$0) may be output since they are complete. In addition, one or more partially finished blocks (e.g., mb4$y$2) may be moved to the scratch pad for subsequent use when processing the below adjacent macroblock. Any remaining partially finished blocks in the filter (e.g., mb1$y$3, mb4$y$1, mb4$y$3) may then be shifted in the filter to make room for new data. The result of the output, store and shift steps is depicted in FIG. 5K, which corresponds exactly to the initial filter state depicted in FIG. 5A. As a result, the sequence of steps depicted in FIGS. 5A-K may be repeated to continue filtering the filter blocks, including the next macroblock (e.g., macroblock 5 or mb5).

Figure 6A:
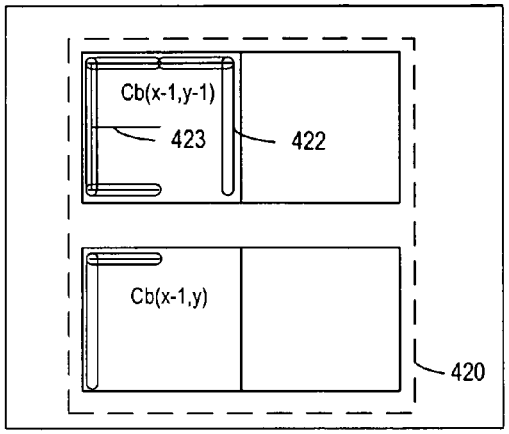
FIGS. 6A-F illustrate how piecewise processing may be used to implement smoothing and deblocking procedures for chroma blocks.

Turning now to FIGS. 6A-F, an illustrative embodiment of the present invention is depicted to show how the WMV9 smoothing and deblocking procedures may be implemented on a Cb or Cr blocks in a macroblock with a piecewise processing technique. Since the Cb and Cr macroblocks are similar, the example is provided with reference to a current Cb macroblock which is identified with index label Cb(x,y). The starting point for the filtering process is depicted in FIG. 6A, where the filter 420 is already loaded with blocks (e.g., Cb(x−1, y−1) and Cb(x−1, y)) that have already been partially processed for overlap smoothing (see, e.g., the oval indication 422) and deblocking (see, e.g., the line indication 423).

Figure 6D:
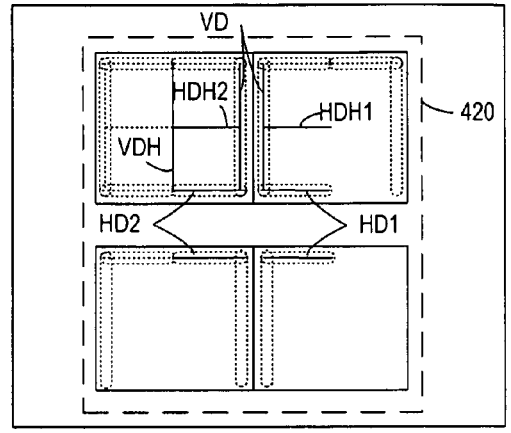
Figure 6B:
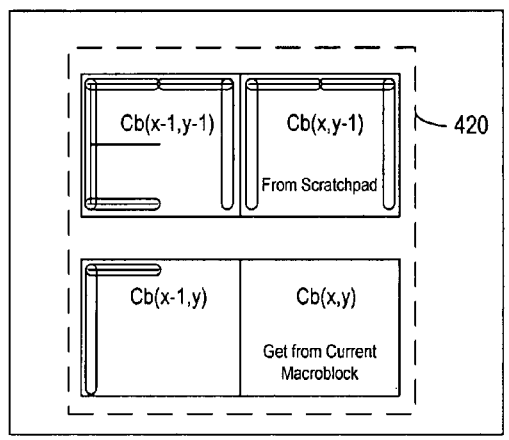

The filter 420 is then filled with additional blocks, as depicted in FIG. 6B. In particular, a partially finished block (e.g., Cb(x,y−1)) is retrieved from the scratch pad memory and loaded in the filter. In addition, the block (e.g., Cb(x,y)) from the current macroblock is loaded into the filter 420. Once the filter blocks are loaded, the filter 420 performs piecewise overlap smoothing, as depicted in FIG. 6C. In particular, vertical overlap smoothing (V) is performed on selected interior vertical edges. Next, horizontal overlap smoothing (H1, H2) is performed on selected interior horizontal edges.

After the filter blocks are partially smoothed, the filter 420 performs piecewise deblocking, as depicted in FIG. 6D. First, horizontal in-loop deblocking (HD1, HD2) is performed on selected 8×8 block boundaries, followed by horizontal in-loop deblocking at selected sub-block boundaries (HDH1, HDH2). Next, the filter performs vertical in-loop deblocking (VD) on selected 8×8 block boundaries, followed by vertical in-loop deblocking at selected sub-block boundaries (VDH).

Figure 6E:
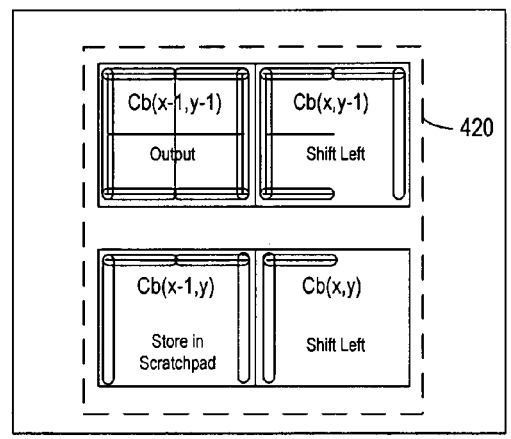
Figure 6C:
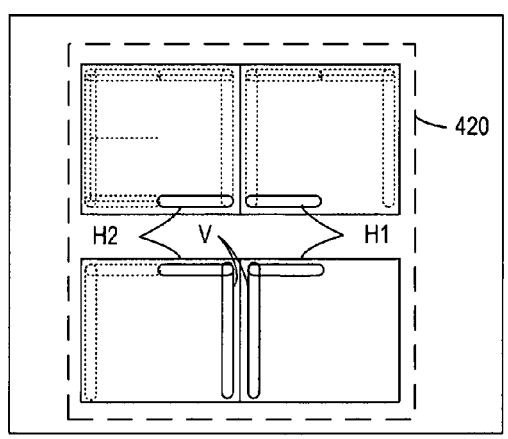
Figure 6F:
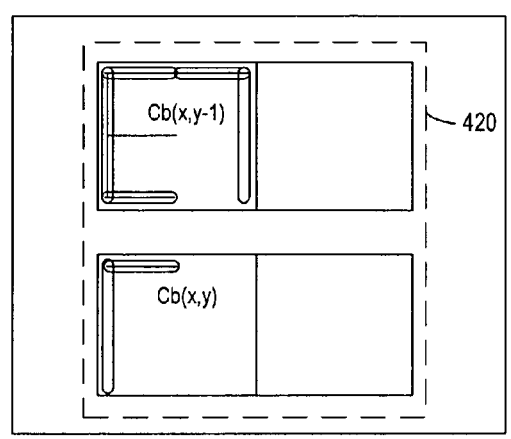

Once the smoothing and deblocking filter operations conclude, the processed filter blocks are stored and shifted, as indicated at FIG. 6E. In particular, the finished block (e.g., Cb(x−1, y−1)) may be output since it is complete. In addition, the partially finished block (e.g., Cb(x−1, y)) may be moved to the scratch pad for subsequent use when processing the below adjacent macroblock. Any remaining partially finished blocks in the filter (e.g., Cb(x, y−1), Cb(x, y)) may then be shifted in the filter to make room for new data. The result of the output, store and shift steps is depicted in FIG. 6F, which corresponds exactly to the initial filter state depicted in FIG. 6A. As a result, the sequence of steps depicted in FIGS. 6A-F may be repeated to filter the next macroblock.

As seen from the foregoing, by providing a small scratch pad memory in the hardware decoder unit, the in-loop filter may temporarily store any partially finished filtering results from the luma and chroma blocks of the current macroblock (denoted as MB(x, y)) in the scratch pad memory. The stored filtering results may then be used in processing the blocks that are adjacent to the macroblock in the row below. In particular, when the filter is processing the macroblock directly below, i.e. MB(x, y+1), the stored data for MB(x, y) is fetched from the scratch pad and used for the processing of MB(x, y+1).

While the partially finished filtering results stored in the scratch pad memory should include at least the 8×8 pixel data, in a selected embodiment, the scratch pad also stores control data for determining whether boundary filtering is required for the block. For example, the control data may include for each block the group of headers for the six blocks in the current macroblock, including 1*mv* or 4*mv* selector, block address, position of block in the frame, mbmode, transform size, coefficient (zero or not zero) and motion vectors (two for forward in x and y directions, and two for backward in x and y directions). The data may be packed in a way to allow the efficient use of burst size.

Because of the small size of the scratch pad memory, the memory may be located on the same chip as the video accelerator, though for typical frame sizes, the scratch pad may be located on a different chip, such as the DDR memory or other external memory. However, by locating the scratchpad memory in the video accelerator hardware unit 101, improved memory access performance is obtained. By minimizing the size of the scratch pad memory, the manufacturing costs for the media acceleration hardware unit may be reduced as compared to including a large memory buffer for storing data blocks for the entire frame. For example, a scratch pad memory that is used to store partially finished filtering results, including control data and pixel data, may be calculated as follows:

Size of scratch pad=(576 bytes)×(number of macroblock horizontally in the frame).

As seen from the foregoing, the size of the scratch pad is relatively small when the size of the frame is large in the vertical direction. In other words, the size of the scratch pad depends on the size of the frame in the horizontal direction. It will be appreciated that the piecewise processing techniques described herein may advantageously be used in connection with a large memory for holding the entire frame to improve speed of filtering operations, insofar as the filtering can begin on the first macroblock before the entire frame is decoded. However, the use of a scratch pad memory provides cost and speed advantages over using a large memory for storing the whole frame which is costly and adds overhead to access time. The use of the scratch pad also fits very well in to the pipelined processing in the filtering algorithm.

The particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A video accelerator adapted to perform hardwired decoding of video data processed with block transformations, said video accelerator comprising:
    an in-loop filter for both overlap smoothing and deblocking selected pixel data in a first macroblock to generate at least one first partially filtered block and at least one first finished block; and
    a scratch pad memory for storing said first partially filtered block for subsequently overlap smoothing and deblocking selected pixel data in a second macroblock.

2. The video accelerator of claim 1, where the video accelerator comprises an inverse quantizer and an inverse transformer.

3. The video accelerator of claim 1, where the in-loop filter fetches a second partially filtered block from scratch pad memory for use in overlap smoothing and deblocking pixel data in the first macroblock, said second partially filtered block having been previously generated during processing of a previous macroblock.

4. The video accelerator of claim 1, where said scratch pad memory is large enough to hold no more than a row of partially filtered blocks from a frame of video data.

5. The video accelerator of claim 1, where each partially filtered block stored in the scratch pad memory comprises pixel data and control data.

6. The video accelerator of claim 1, wherein said in-loop filter sequentially performs overlap smoothing and deblocking on a plurality of macroblocks in pipelined fashion.

7. The video accelerator of claim 1 formed on a single integrated circuit.

8. The video accelerator of claim 1 where the scratch pad memory and video accelerator are formed on separate integrated circuits.

9. The video accelerator of claim 1 where the in-loop filter completely filters at least a first block adjacent to a previously processed macroblock for overlap smoothing and deblocking; and partially filters at least a second block adjacent to a subsequently processed macroblock for overlap smoothing and deblocking.

10. A method for decoding video data processed with block transformations into a plurality of macroblocks, comprising:
overlap smoothing and deblocking selected pixel data in a first macroblock to generate at least one first partially filtered block and at least one first finished block; and
storing said first partially filtered block in a scratch pad memory for subsequently overlap smoothing and deblocking selected pixel data in a second macroblock.

11. The method of claim 10, further comprising fetching a second partially filtered block from the scratch pad memory for use in said overlap smoothing and deblocking step, said second partially filtered block having been previously generated during processing of a previous macroblock.

12. The method of claim 10, where the overlap smoothing and deblocking step is performed by an in-loop filter.

13. The method of claim 12, where the in-loop filter sequentially processes each row of macroblocks in a video frame for overlap smoothing and deblocking one macroblock at a time.

14. The method of claim 12, where the in-loop filter sequentially performs overlap smoothing and deblocking on a plurality of macroblocks in pipelined fashion.

15. The method of claim 10, comprising:
overlap smoothing and deblocking selected pixel data in a first row of macroblocks to generate a plurality of partially filtered blocks; and
storing said plurality of partially filtered blocks in the scratch pad memory.

16. The method of claim 15, further comprising:
retrieving a first partially filtered block from the scratch pad memory when overlap smoothing and deblocking selected pixel data in a second row of macroblocks; and
overlap smoothing and deblocking selected pixel data in the first partially filtered block to complete the overlap smoothing and deblocking processing on the first partially filtered block, thereby generating a finished block.

17. The method of claim 10, where the overlap smoothing and deblocking step comprises piecewise overlap smoothing and deblocking on at least a first block within each macroblock so that said first block is partially processed in a first filter operation, is stored in the scratch pad memory and is subsequently completely processed in a second filter operation.

18. In a video processing system for decoding video information from a compressed video data stream, an apparatus comprising:
a processor that partially decodes the compressed video data stream to generate partially decoded video data; and
a video decode circuit that decodes the partially decoded video data to generate video frames, said video decode circuit comprising
means for overlap smoothing and in-loop deblockinq selected pixel data in a first macroblock to generate at least one first partially filtered block and at least one first finished block; and
scratch pad memory for storing said first partially filtered block for subsequently overlap smoothing and in-loop deblockinq selected pixel data in a second macroblock.

19. The apparatus of claim 18, where the scratch pad memory stores partially filtered blocks from a first row of macroblocks, such that each partially filtered block may be fetched by the means for overlap smoothing and in-loop deblockinq during overlap smoothing and in-loop deblocking of a second row of macroblocks.

\* \* \* \* \*